United States Patent [19]

Peterson

[11] Patent Number: 5,018,678
[45] Date of Patent: May 28, 1991

[54] FIBER PAYOUT MACHINE

[75] Inventor: Stanley P. D. Peterson, Tucson, Ariz.

[73] Assignee: Hughes Aircraft Company, Los Angeles, Calif.

[21] Appl. No.: 429,300

[22] Filed: Oct. 30, 1989

[51] Int. Cl.⁵ ............... B65H 54/00; B65H 54/76
[52] U.S. Cl. ............................ 242/47; 242/1; 242/82
[58] Field of Search ............... 242/47, 82, 83, 1

[56] References Cited

U.S. PATENT DOCUMENTS

| | | | |
|---|---|---|---|
| 420,747 | 2/1980 | Tallman | 242/82 |
| 428,971 | 5/1890 | Tallman | 242/82 |
| 3,270,977 | 9/1966 | Tillou, II | 242/82 |
| 3,667,092 | 6/1972 | Engels | 242/47 |
| 3,675,864 | 7/1972 | Eschenbach | 242/47 |
| 3,866,849 | 2/1975 | Eschenbach | 242/47 |
| 3,964,691 | 6/1976 | Pearce et al. | 242/47 |
| 4,153,212 | 5/1979 | Bauch et al. | 242/47 |
| 4,765,556 | 8/1988 | Nasrah | 242/47 X |
| 4,773,607 | 9/1988 | Missout et al. | 242/47 |

FOREIGN PATENT DOCUMENTS 2056516 3/1981 United Kingdom .................. 242/47

Primary Examiner—Stanley N. Gilreath
Attorney, Agent, or Firm—R. M. Heald; C. D. Brown; W. K. Denson-Low

[57] ABSTRACT

A method and apparatus for pulling fiber from a bobbin using a payout wheel dispensing the fiber into the air in a helical pattern. The invention includes a deflector mounted in the path of the fiber which is rotated as the fiber is payed out. The deflector includes a hollow shaft through which fiber, from the wheel, passes. The hollow shaft includes a tunnel along the length thereof. The tunnel has a first portion, along the longitudinal axis of the shaft, and a second portion at an angle with respect to the first portion.

12 Claims, 3 Drawing Sheets

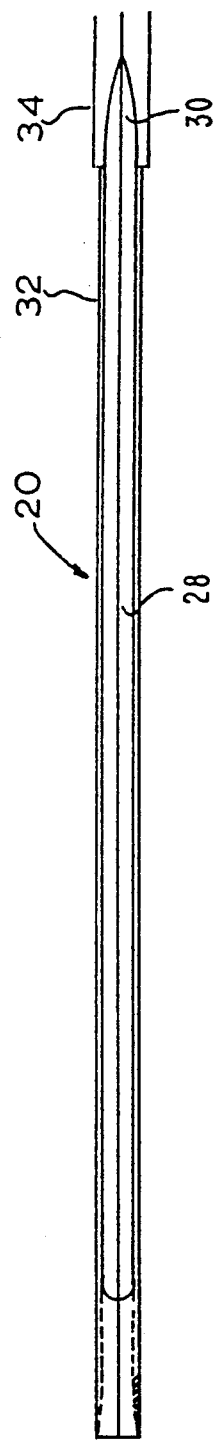
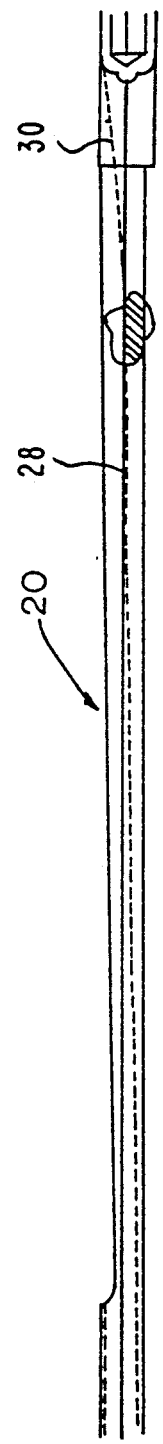
FIG. 3(b)
FIG. 3(c)

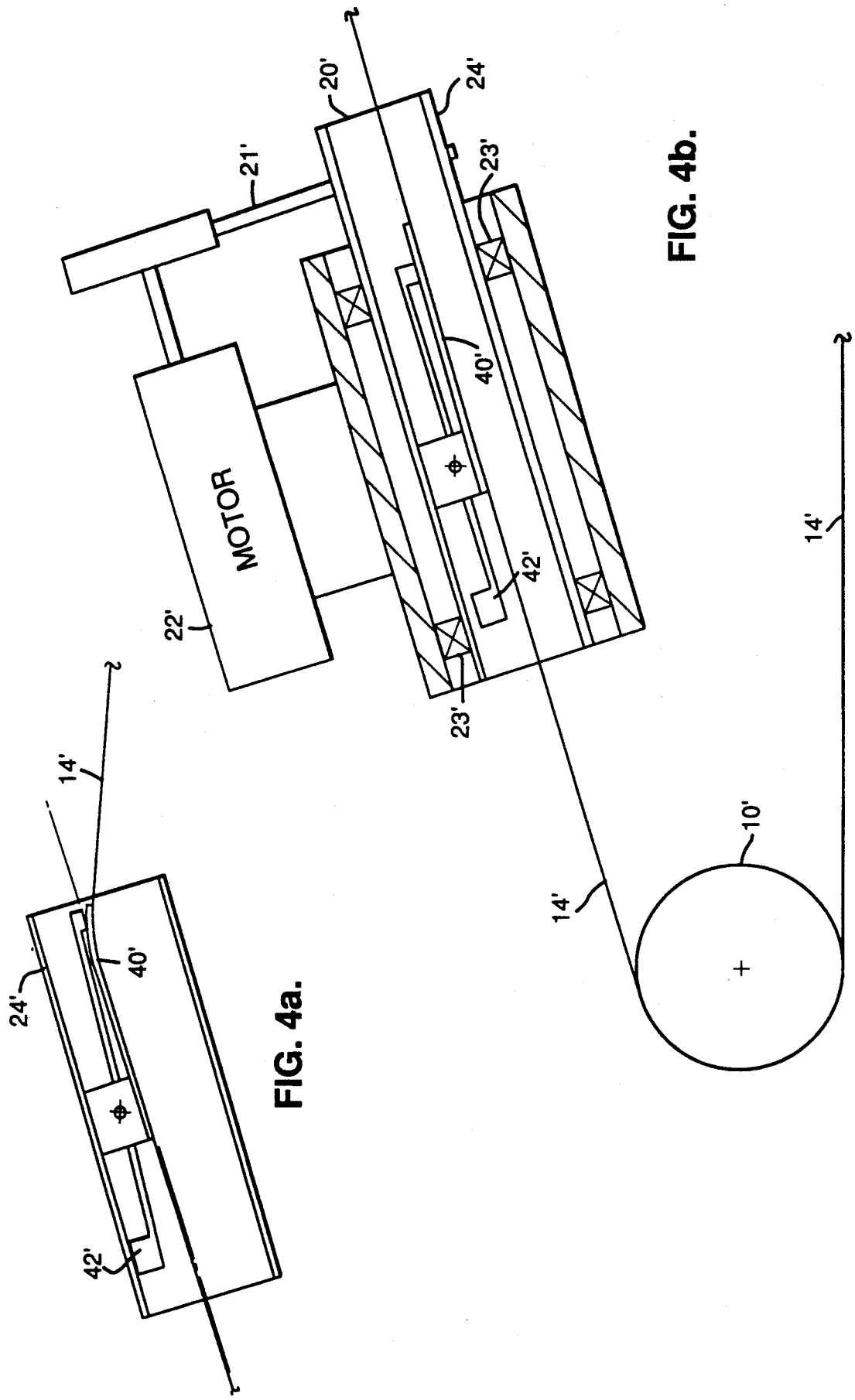

FIBER PAYOUT MACHINE

BACKGROUND OF THE INVENTION

1. Field of the Invention

The present invention relates to optical fiber technology. More specifically, the present invention relates to techniques for high speed payout of optical fiber.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Optical guidance of high speed vehicles involves a payout of optical fiber under conditions which place considerable stress on the fiber. Hence, numerous techniques have been developed to test the ability of the fiber to withstand such stress. Ideally, the test provides an accurate simulation of the stress condition on the fiber in a real application.

For example, a payout test has been developed for ground launched optically guided vehicles which involves the high speed payout of optical fiber from a bobbin into the air. A signal is transmitted over the fiber and the desired test measurements are made. Unfortunately, it has been discovered that as the fiber exits the payout machine, it travels 20 to 50 feet in a straight line before aerodynamic forces cause it to stop almost instantly in mid-air. This causes a snarl of fiber to form in the air before falling to the ground. The numerous sharp bends induced in the fiber cause signal attenuation and prevent vehicle control signals from being transmitted over the fiber. This undesirable "bird nesting" of the fiber has been observed to affect signal transmission at payout velocities exceeding 400 feet per second.

Thus, there is a need in the art to provide an improvement in the high speed payout of optical fiber from a stationary payout machine.

SUMMARY OF THE INVENTION

The need in the art is addressed by the present invention. The invention is adapted for use with a payout machine having a payout wheel for pulling optical fiber from a bobbin and dispensing it into the air. The invention provides a method and apparatus for deflecting the fiber into a helical pattern as the fiber is payed out from the payout wheel. The invention includes a deflector mounted in the path of the fiber which is rotated as the fiber is payed out to generate the helical payout pattern.

In a specific embodiment, the deflector includes a hollow shaft through which the fiber passes as it being payed out from the payout wheel. The hollow shaft includes a tunnel along the length thereof. The tunnel has a first portion which directs the fiber along the longitudinal axis of the shaft, and a second portion at an angle with respect to the first portion. The spreading of the fiber by the rotating deflector mitigates signal attenuation.

Ideally, the rate of rotation of the deflector is matched to the rate at which fiber is pulled from the bobbin. The direction of rotation of the deflector is opposite to the direction at which fiber is pulled off the bobbin. This effectively cancels the twist induced in the fiber during payout from the bobbin and further reduces sharp bends or "pigtails" in the fiber.

BRIEF DESCRIPTION OF THE DRAWINGS

FIG. 3(b) is a top view of the alternative preferred embodiment of the deflector utilized in the payout machine of the present invention.

FIG. 3(c) is a side view, partially in section, of the alternative preferred embodiment of the deflector utilized in the payout machine of the present invention.

FIGS. 4a and 4b show is a sectional view of an alternative implementation of the fiber payout machine of the present invention.

FIG. 4(a) is a sectional view of a portion of FIG. 4.

DESCRIPTION OF THE INVENTION

Illustrative embodiments and exemplary applications will now be described with reference to the accompanying drawings to disclose the advantageous teachings of the present invention.

Figure 1:
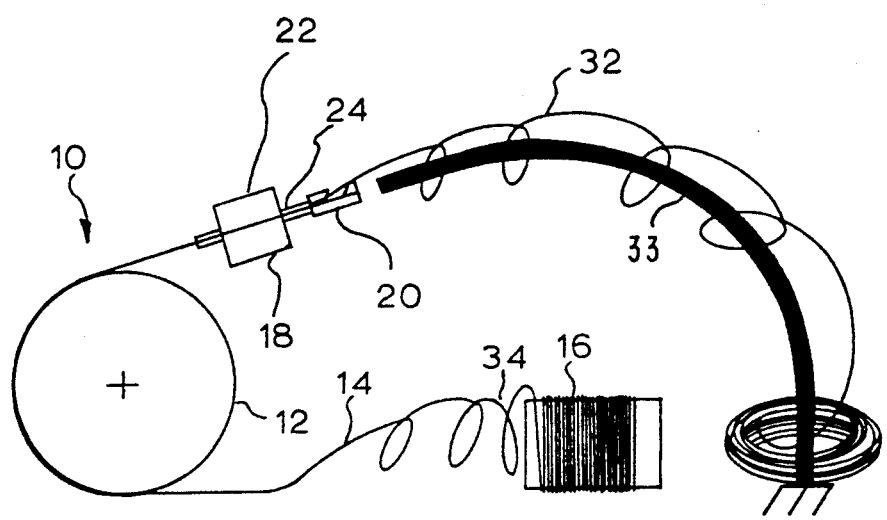
FIG. 1 is a diagram of the fiber payout machine of the present invention.

FIG. 1 is a diagram of the improved fiber payout machine 10 of the present invention. The machine 10 includes a conventional (pneumatic shoe) payout wheel 12 which pulls optical fiber 14 off a bobbin 16 and dispenses it into the air. A particularly novel feature of the invention is the provision of a motorized deflector 18 which includes a deflector 20 and a motor 22. The motor 22 drives the deflector 20 so that the fiber 14 is payed out in a helical pattern 32. As shown in FIG. 1, an optional bent rod 33 which may be used to collect the fiber 14 as it is being payed out. The bent rod 33 is positioned to lie in the axis of the payout helix 32 and collects the fiber in circles on the ground. This is a convenient way of collecting the fiber but is not required for operation of the deflector.

The motor 22 is shown as a hollow shaft motor although those skilled in the art will appreciate that other motor arrangements may be used to provide rotational drive of the deflector 20. One such alternative is to use a belt driven spindle such as is used in a tool post grinder. A working model was built utilizing a spindle from a Thermac model no. J-2A grinder.

Figure 2:
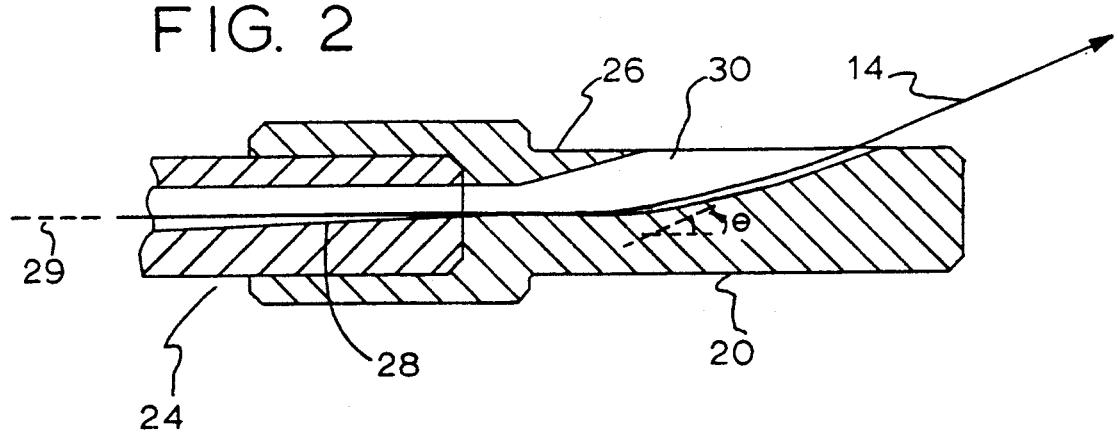
FIG. 2 is a sectional view of an illustrative implementation of the deflector.

The illustrative implementation of the deflector 20 is shown in the sectional view of FIG. 2. As shown in FIG. 2, the deflector 20 is adapted for insertion over the hollow shaft 24 of the motor 22. The deflector 20 may be constructed of hard anodized aluminum for good wear characteristics and teflon coated for low friction. A tunnel 26 is provided in the deflector 20. The tunnel 26 includes a first section 28 which directs the fiber onto a longitudinal axis 29 of the motor shaft 24.

The tunnel 26 includes a second section 30 which as a deflector with a large radius to gently change the direction of the fiber 14 through an angle $\theta$. The deflector angle $\theta$ is selected to provide the proper diameter helix based on fiber velocity and deflector rotational velocity.

In the illustrative embodiment, a 10 degree angle was chosen to provide the required helix diameter. In the preferred embodiment, the deflector angle $\theta$ and the rotational velocity are chosen so that the mean radius of the payout helix 32 is equal to that of the payin helix 34.

Figure 3A:
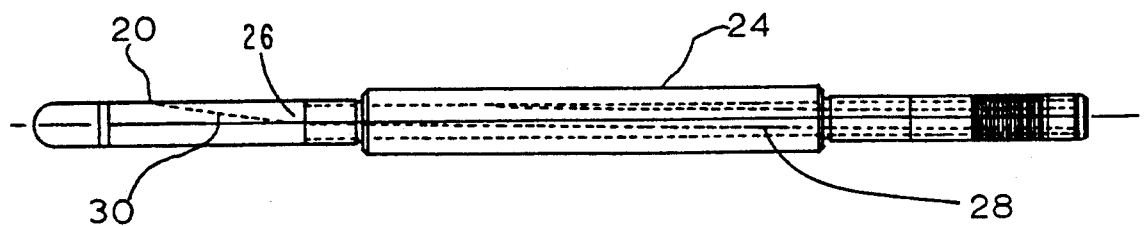
FIG. 3(a) shows a plan view of an alternative preferred embodiment of the deflector utilized in the payout machine of the present invention.

FIG. 3(a) shows a preferred alternative embodiment of the deflector 20. For this embodiment, the deflector 20 is designed to fit inside a hollow shaft 24. The hollow shaft 24 would replace the motor shaft 24 of the motor 22 or the spindle shaft as described above. The deflector of FIG. 3(a) has a tunnel 26 with the first and second sections 28 and 30, respectively, as mentioned above. Section 28 incorporates a ramp to direct the fiber onto the hollow shaft centerline. Section 30 incorporates a circular radius deflector to redirect the fiber. The deflector 20 may be secured to the shaft 24 by pinning or any conventional keying device. Shaft 24 may be rotated as part of a motor or may be belt driven by a motor (not shown). FIGS. 3b and 3c detail the deflector 20 which is inserted into hollow shaft 24 during operation.

FIG. 3(b) is a top view of the deflector 20 of FIG. 3(a) and FIG. 3(c) is a side view, partially in section, of same. As shown more clearly in FIGS. 3(b) and 3(c), the first section 28 is a long straight ramp designed to bring the fiber 14 to the shaft center line in a very gradual manner. The second section 30 is a circular curve to gently change the angle of the fiber 14. By gently changing the angle of the fiber 14, stress due to deflection is minimized. The ramped first section 28 is substantially disposed within a small diameter first portion 32 of the deflector 20, while the second section 30 thereof is disposed in a larger diameter second portion 34. The small diameter cross-section of the first portion 32 allows for insertion into the hollow motor shaft 24. The larger diameter portion 34 extends beyond the hollow shaft and provides an exit for the deflected fiber.

In operation, the fiber 14 is fed from the bobbin 16 through the payout wheel 12 and the deflector 20. Then, the payout wheel 12 is activated and the motor 22 for the deflector 20 is activated. Activation of the motor 22 causes the deflector 20 to rotate about the longitudinal axis of the fiber 14. In the preferred embodiment, the motor 22 is designed so that the rotational rate of the deflector matches the rotational rate of the fiber helix as it leaves the bobbin. For example, a bobbin 16 having a six inch diameter yields approximately 1.5' of fiber in each turn of the helix 24. Thus, the deflector should rotate one turn for every 1.5' of fiber passing therethough. Stated alternatively, the rotational payout rate of the deflector 20 should match the rotational helix payout rate of the bobbin 16. In practice, the invention was found to operate satisfactorily with a deflector payout rotational payout rate within ±50% the helix rotational rate.

Also, in the preferred embodiment, the direction of rotation of the deflector is opposite to the direction at which fiber is pulled off the bobbin. This effectively cancels the twist induced in the fiber during payout from the bobbin and further reduces sharp bends or "pigtails" in the fiber.

FIGS. 4a and 4b show is an alternative embodiment of the fiber payout machine 10' of the present invention. The embodiment of FIG. 4b includes a deflector assembly 20' driven by a belt 21' and motor 22'. The deflector assembly 20' is mounted on bearings 23'. The deflector assembly 20' includes a flexible plate 40' which is biased by a pivotally mounted weight 42'. Prior to the activation of the motor 22', the plate 40' is straight and the fiber 14' is easily inserted therethrough. When the assembly 20' is spun up by the motor 22', centrifugal forces cause the weight 42' to bear on the plate 40'. This induces a deflection in the fiber 4' in the manner described above. In this embodiment, the degree of deflection, that is, the size of the payout helix, may be controlled by controlling the rate of rotation of the assembly 20'.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. In a payout machine having a payout wheel for pulling optical fiber axially from a bobbin to rotate said fiber in a first direction and for dispensing said fiber into the air, an improvement wherein said improvement comprises:
   means for deflecting said fiber into a helical pattern as said fiber is paid out from said payout wheel, said means including a deflector mounted in the path of the fiber and means for rotating said deflector in a second direction opposite said first direction.

2. The invention of claim 1 wherein said deflector includes a hollow shaft through which said fiber passes as it being payed out from said payout wheel.

3. The invention of claim 2 wherein said hollow shaft includes a tunnel along the length thereof, said tunnel having a first portion along the longitudinal axis thereof and a second portion at an angle with respect to said first portion.

4. The invention of claim 1 including a bent rod lying along the axis of said helical pattern for collecting said fiber as said fiber is being payed out.

5. An improved payout machine for paying out optical fiber from a bobbin, including:
   a payout wheel for pulling fiber axially from said bobbin to rotate said fiber in a first direction;
   a deflector mounted in the path of the fiber for deflecting said fiber as it is being paid out from said payout wheel; and
   means for rotating said deflector in a second direction opposite said first direction to payout said fiber in a helical pattern.

6. The invention of claim 5 wherein said deflector includes a hollow shaft through which said fiber passes as it being payed out from said payout wheel.

7. The invention of claim 6 wherein said hollow shaft includes a tunnel along the length thereof, said tunnel having a first portion along the longitudinal axis thereof and a second portion at an angle with respect to said first portion.

8. An improved payout machine for paying out optical fiber from a bobbin, including:
   a payout wheel for pulling fiber from said bobbin;
   a deflector mounted in the path of the fiber for deflecting said fiber as it is being paid out from said payout wheel; and
   means for rotating said deflector,
   said deflector including a plate which flexes in response to such rotation to payout said fiber in a helical pattern.

9. The invention of claim 8 including a weight pivotally mounted with respect to said plate to apply a force to said plate in response to such rotation.

10. A method for paying out fiber including the steps of:
   axially pulling fiber from a bobbin to rotate said fiber in a first direction;
   passing the fiber through a deflector; and
   rotating the deflector in a second direction opposite said first direction to payout said fiber in a helical pattern.

11. The invention of claim 10 wherein the step of rotating the deflector includes the step of matching the speed of rotation of the deflector to the rate at which fiber is pulled from the bobbin.

12. The invention of claim 10 including the step of varying the rate of rotation of said deflector.

* * * * *